Nov. 14, 1933.                G. F. BEHRINGER                1,934,907
                              VARIABLE CONDENSER
                            Filed March 14, 1932
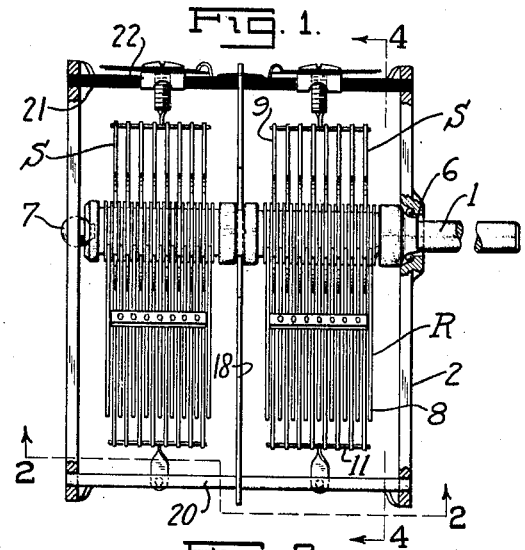
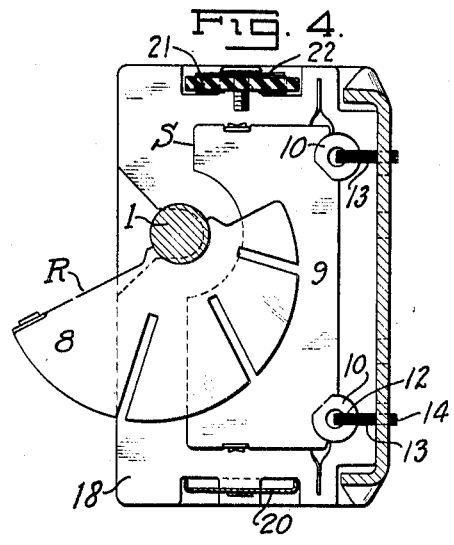
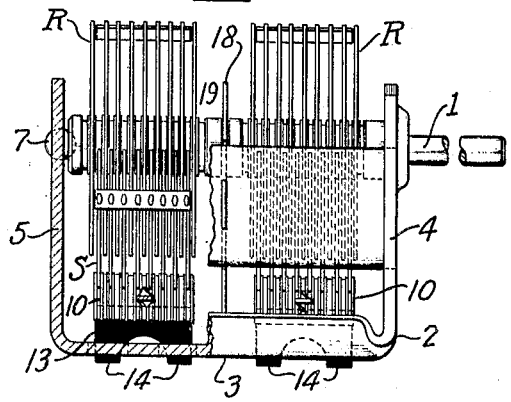
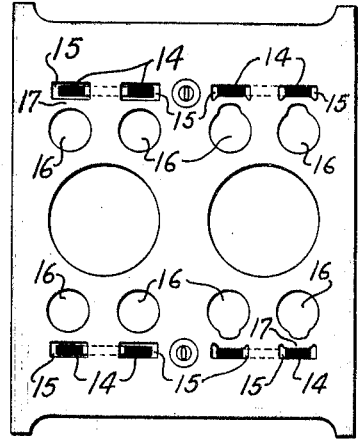
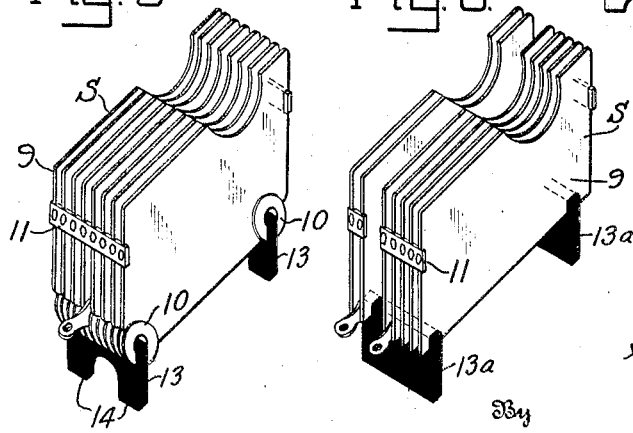
Inventor
Grover F. Behringer,
By Owen & Owen
                Attorneys.

Patented Nov. 14, 1933

1,934,907

UNITED STATES PATENT OFFICE 1,934,907

VARIABLE CONDENSER

Grover F. Behringer, Defiance, Ohio, assignor to The American Steel Package Company, Defiance, Ohio, a corporation of Ohio Application March 14, 1932. Serial No. 598,603

11 Claims. (Cl. 175—41.5)

This invention relates to variable condensers, and more particularly to condensers of the type having rotor and stator elements and an air dielectric, as commonly employed in radio circuits.

The primary object of the invention is to provide a simplified and improved mounting for the electrodes of a condenser which reduces the cost and labor of assembly and which is more efficient both mechanically and electrically than the commonly employed types of mounting.

A further object of the invention is to provide a stator mounting which is free from screws, rivets and similar extraneous metallic fastening elements which might become loosened by vibration, and which mounting, when secured in position, provides a rugged and permanent structure.

Another object of the invention is to provide a stator mounting which may be easily adjusted during assembly to assure accurate positioning of the stator with respect to the rotor.

A further object of the invention is to provide a means whereby the stator element may be divided into two or more sections electrically insulated one from the other with the object in view of introducing into the circuit the variable capacity of any one of these sections separately, or of all of the sections in parallel.

Further objects and advantages will become apparent as the description proceeds, reference being had to the accompanying drawing, in which—

Figure 1 is a plan view of a gang-type of condenser embodying the invention, with parts broken away. Fig. 2 is an elevation partly in section taken on the line 2—2 in Fig. 1. Fig. 3 is a perspective view of one of the stator units, and its attached mounting members, removed from the condenser frame. Fig. 4 is a section on the line 4—4 in Fig. 1. Fig. 5 is a bottom plan view of the condenser showing the feet of one stator unit fixedly attached to the frame in a manner constituting a feature of the invention and showing the feet of the other stator unit floatingly mounted in the frame 1 preparatory to being secured in properly adjusted relation thereto, and Fig. 6 is a perspective view of a stator unit showing a slightly modified form of mounting over that shown in Fig. 3, and also showing the elements of the stator as divided into sections electrically insulated one from the other.

Referring to the drawing, R designates the rotor plate sets or units, which are fixedly mounted on a shaft 1, and S the stator plate sets or units with which the plates of the corresponding rotor sets are adapted to interleave.

A frame 2 is provided, which, in the form shown, comprises a metallic plate bent in U-shape to form the base 3 and the opposed end uprights 4 and 5. In forming said end plates 4 and 5, I prefer to bend them slightly more than 90° from the base 3, making them slightly convergent for the purpose which will later become apparent. The end plate 4 of the frame is provided with a bearing opening 6, and the end plate 5 is provided with a spherical form of bearing 7 formed by pressing a hard spherical bearing member into an opening in the plate with a portion of the member projecting inwardly from the plate to provide a spherical bearing.

Each rotor set R comprises a plurality of plates 8 carried in proper spaced relation by the shaft 1, which has one end projected through and mounted in the bearing opening 6, preferably in an anti-friction manner, and has its other end terminating in an axially disposed socket adapted to receive the spherical bearing 7. The plates 8 may be fixed to the shaft 1 in any well known manner, but it is preferred to forcibly insert them in transverse slots 22 in the shaft in substantially the manner disclosed in my Patent 1,756,447.

A stator set or unit S is associated with each rotor set R, as well understood in the art, and comprises a plurality of plates 9 secured in properly spaced relation, in the present instance, by mounting their lower corners in transverse slots provided in a respective cross-bar 10. They are also preferably held in proper spaced relation at each end by spacer-bars 11. The cross-bars or members 10 are preferably of cylindrical form, as shown, and provided at the bottom side of each, with respect to the stator plates, with a longitudinally extending slot 12. The mounting supports for the stator units comprise strips 13 of dielectric material, which are inserted in and firmly gripped by the walls of the slot 12 of the cross-bars 10. The strips 13 are forced into the receiving slots and if thicker than the slots, which is preferable to secure a rigid uniting of the two, the forming of the cross-bars 10 in cylindrical form facilitates an outward springing of the walls of the slot as the strip is forced therein. The dielectric strips 13 may be of any suitable form, but in the present instance are shown as rectangular and shaped to provide depending legs 14.

The above method of mounting the stator plates may, of course, be varied, for instance as shown in Fig. 6, wherein the stator dielectric mounting strips, which in this figure are designated 13ª, are slotted at their upper edges to receive the bottom edges of the stator plates and into which such edges may be firmly secured in any suitable manner, as by a sealing compound. Figure 6 also illustrates a set of stator plates constituting a stator unit as being separated into sections of the desired number of plates, which sections are insulated from one another by the mounting strips 13ª. This enables the introduction into the condenser circuit of the variable capacity of any one of these sections separately, or of all of the sections in parallel.

The base of the frame 2 is provided with openings 15 positioned to receive respective feet 14 of the stator unit mounting strips 13 when the stator units are in substantially proper position in the frame, and closely adjacent to each opening 15 is provided a companion hole or opening 16, with a thin strip or web of material 17 disposed between it and the associated opening 15. The openings 15 are slightly larger than the mounting feet 14 to permit a limited floating movement of the feet in the openings preparatory to placing the stator unit in properly adjusted relation to the frame and rotor. When such adjustment has been obtained, which is accomplished in any suitable manner, as well understood in the art, the wall or strip 17 between the adjacent openings 15 and 16 is displaced to cause a relative contracting of the walls of the openings 15 and a consequent firm gripping of the feet of the mounting strips therein. This displacement action of the frame material may be caused by inserting a suitable tool for the purpose into the opening 16, or in any other suitable manner.

If the condenser is of the gang-type, a suitable shielding plate 18 is inserted in the space between each adjacent pair of condenser units. These plates are supported at their bottom portion by the base of the frame and by engagement with a peripheral slot 19 in the rotor shaft, and also by interengagement at their ends with suitable end strips 20 and 21, the latter being of dielectric material and carrying trimming condensers 22 for correction of variation of circuit capacities external to the condenser. The strips 20 and 21 are mounted at their ends in slots provided in the end members 4 and 5 of the frame in registering relation therewith.

In assembling the condenser in the form shown, the stator units S are first placed in position in the frame, with the feet 14 of the dielectric strips 13 thereof extending freely into the openings 15 in the frame base. The rotor assembly is then positioned in the frame with the rotor plates in proper interleaving relation to the plates of the stator units and with the extended end of the shaft 1 projected through the bearing opening 6, thus permitting the opposite end of the shaft to be forced into proper bearing engagement with the spherical bearing member 7 by a relative outward springing action of the frame ends. This provides a rugged and secure mounting for the rotor without the use of extraneous fastenings, the rotor being held in position in its bearings by the resilient action of the frame itself. The strips 20 and 21 may now be positioned in the receiving slots provided therefor in the frame ends and in interengaging relation to the shielding plate 18.

The condenser parts having thus been assembled, the stator units, which are free for limited floating movements relative to the frame, are properly aligned with the rotor units in any suitable manner, and the stator units are then securely clamped or held in this aligned position by distorting the wall or walls of the frame openings 15 to effect a gripping and holding of the feet portions 14 of the dielectric mounting strips 13 in adjusted position. In the present instance, the clamping of the feet in the frame openings 15 is effected by a distorting or displacement of the thin strips 17 provided between the associated openings 15 and 16 by inserting suitable tools for this purpose into the openings 16. It is apparent that in this manner each stator unit is firmly held in place in the frame without the use of screws, rivets or similar fastenings, which would increase the cost and labor of assembly.

It will thus be seen that I have provided a condenser having a minimum of parts and one which assures ease and accuracy of plate alignment. By holding the rotor in position solely by the springing action of the frame, the usual fastenings and supports are eliminated, and by supporting the stator units simply by means of dielectric strips in coaction with the walls of the frame openings, I do away with all separate and detachable fastening elements which usually are found in variable condensers of this character.

I wish it understood that my invention is not limited to any specific form of the parts, as it is capable of numerous modifications and changes without departing from the spirit of the claims.

Having thus described my invention, what I claim as new, and desire to secure by United States Letters Patent, is:

1. In a variable condenser, a frame having openings therein, a stator unit comprising a plurality of stator plates, longitudinally slotted cross-bars connecting the stator plates at their lower portions, and dielectric mounting strips fixedly mounted in and projecting from the slots of the cross-bars and having portions projecting into respective openings of the frame and secured therein by gripping coaction of the opening walls therewith.

2. In a variable condenser, a frame having openings therein, a stator unit comprising a plurality of stator plates, tubular cross members secured to and forming a spacing means for the plates at or adjacent to their lower edge portions, said members being longitudinally slotted through the walls thereof, and a dielectric mounting strip secured in the slot of each cross member and having parts projected transversely from the cross member and fixedly mounted in the frame openings.

3. In a variable condenser, a frame having base openings therein, stator electrodes comprising a set of stator plates, spacing elements for said plates, each having a longitudinal slot, insulating supports having parts received and anchored in the slots of the spacing elements and having other parts received in the openings of said frame, the walls of the openings having gripping engagement with said parts whereby to anchor the stator electrodes in said frame.

4. In a variable condenser, a frame having a base with openings therein, stator electrodes, and dielectric mounting members attached to the stator electrodes transversely thereof and having parts received in said base openings, a wall of each of the openings having a displaced portion contracted against the respective mounting member part received by the opening to anchor the mounting member in proper adjustment in the frame.

5. In a variable condenser, a frame having a base and opposing sides, a shaft rotatably supported by said sides, rotor electrodes carried by said shaft, a set of stator electrodes interleafing with the rotor electrodes, and dielectric mounting members for the stator electrode fixedly attached thereto at their bottom edges, said frame base having openings therein receiving portions of said members and with the walls thereof gripping and holding said portions in adjusted rigid relation to the frame base.

6. In a variable condenser, a U-shape frame having openings in its base portion, a rotor unit supported by the frame sides above the base, a stator unit having electrode plates interleafed with those of the rotor unit, and dielectric mounting members fixed to the bottom portion of the stator unit and having portions disposed in said openings and firmly held relative to the frame by pinching action of the opening walls.

7. In a variable condenser, a U-shape frame having openings in its base portion, a rotor unit mounted between the frame sides and supported thereby, a stator unit disposed above the frame base with its electrode plates interleafed with those of the rotor unit, and dielectric mounting strips for the stator unit disposed transverse to its plates and fixed to said unit, said strips having portions projected in respective openings in the base and held relative thereto by gripping action of the opening walls.

8. The method of assembling a metallic condenser frame and a stator unit comprising a plurality of plates, consisting in providing said unit with dielectric mounting members and said frame with openings for receiving respective portions of said members and initially permitting floating movements of the unit relative to the frame for proper alignment with the rotor element, then effecting said alignment, and finally distorting the opening walls to firmly grip the inserted portions of said members and anchoring the unit in aligned position in the frame.

9. The method of assembling a metallic frame and the rotor and stator units of a condenser, consisting in providing openings in the frame and providing insulating supporting members on the stator unit, placing the stator unit in the frame with its supporting members floatingly received by said openings, then mounting the rotor unit in the frame in interleaved relation to the stator unit, then adjusting the stator unit relative to the frame for proper aligned relation to the rotor, and then distorting the opening walls to grip the inserted members and anchor the stator unit in aligned position.

10. The method of assembling the metallic frame and rotor and stator units of a condenser, consisting in providing mounting openings in the frame and adjacent tool-receiving openings with thin walls interposed between the adjacent mounting and tool-receiving openings, attaching insulating supporting members on the stator unit, placing the stator unit in the frame with its supporting members floatingly received by the mounting openings, then mounting the rotor unit in the frame in interleaved relation to the stator unit, then adjusting the stator unit relative to the frame in proper aligned relation to the rotor unit, and then inserting tools in the tool-receiving openings and distorting the thin walls between adjacent tool-receiving and mounting openings to effect a gripping of the inserted members to anchor the stator unit in aligned position in the frame.

11. In a variable condenser, a frame having a base with openings therein, a stator unit, dielectric mounting members fixed to said unit and having parts received in said base openings, a wall of each of the openings having a displaced portion contracted against the respective mounting member part received by the opening to anchor the mounting member in proper adjustment in the frame.

GROVER F. BEHRINGER.